United States Patent [19]

Ataka et al.

[11] Patent Number: 4,926,954
[45] Date of Patent: May 22, 1990

[54] FRONT AND REAR WHEEL STEERING VEHICLE WITH A MINIMIZED MANEUVERING AREA

[75] Inventors: Hiroshi Ataka; Yoshimi Furukawa, both of Saitama, Japan

[73] Assignee: Honda Giken Kogyo Kabushiki Kaisha, Tokyo, Japan

[21] Appl. No.: 244,966

[22] Filed: Sep. 15, 1988

[30] Foreign Application Priority Data

Sep. 16, 1987 [JP] Japan .................................. 62-231474
Aug. 26, 1988 [JP] Japan .................................. 63-212260

[51] Int. Cl.$^5$ .............................................. B62D 5/06
[52] U.S. Cl. .................................... 180/140; 180/142; 280/91; 364/424.01
[58] Field of Search ...................... 180/140, 141, 142; 280/91; 364/424.01

[56] References Cited

U.S. PATENT DOCUMENTS

| | | | |
|---|---|---|---|
| 4,690,431 | 9/1987 | Ito et al. ............................... | 180/140 |
| 4,706,978 | 11/1987 | Ito ....................................... | 180/140 |
| 4,770,265 | 9/1988 | Allen ................................... | 180/140 |
| 4,778,023 | 10/1988 | Sugasawa ............................ | 180/140 |

*Primary Examiner*—David M. Mitchell

*Attorney, Agent, or Firm*—Skjerven, Morrill, MacPherson, Franklin & Friel

[57] ABSTRACT

The maneuvering area of a front and rear wheel steering vehicle is minimized by making the rear wheels follow the trajectories of the front wheels. This can be accomplished by steering the rear wheels so that they may coincide, in a spatially fixed absolute coordinate system, with the steer angles of the front wheels when they were located at the same locations as the current positions of the rear wheels. Further proposed is an algorithm for achieving the required rear wheel steering control which comprises the steps of detecting the yaw angle of the vehicle body and subtracting from the steer angles of the front wheels at the time point when the front wheels were located at the current positions of the rear wheels, the change in the yaw angle of the vehicle body from the said time point to the current time point. Thus, the vehicle is able to go through a most narrow and tortuous road for the given size of the vehicle without deviating from the prescribed course of the road, and the driver is required only to get the front part of the vehicle pass through narrow points of the road without paying attention to the rear part of the vehicle.

18 Claims, 11 Drawing Sheets

FRONT AND REAR WHEEL STEERING VEHICLE WITH A MINIMIZED MANEUVERING AREA

TECHNICAL FIELD

The present invention relates to a front and rear wheel steering vehicle with a minimized maneuvering area so that it can pass through extremely narrow and tortuous roads.

BACKGROUND OF THE INVENTION

In a conventional four-wheeled vehicle which is steerable only by the front wheels, a disagreement in the trajectories 4 and 5 of, for instance, the inner front wheel 2 and the inner rear wheel 3, or a socalled inner radius difference, arises when the vehicle makes a turn about a point 0 as shown in FIG. 1 (the arrow F indicates the direction of the movement of the vehicle). The outer wheels also have a similar difference in trajectory as the vehicle makes a turn although the difference is slightly smaller than the inner radius difference because of the difference in the effective wheel bases of the inner and outer wheel pairs. Therefore, even when the front part of the vehicle has managed to go through a narrow point of the road, the rear part of the vehicle may not be able to do so without deviating from the prescribed course of the road or hitting a wall if the road is surrounded by such a wall on either side. It is thus known that there is a problem in the handling of conventional vehicles when they move through a narrow and tortuous part of a road.

Based upon this recognition, there has been proposed the front and rear wheel steering vehicle which steers the front and rear wheels 2 and 3 by the same angle and in the opposite phase relationship as shown in FIG. 2. According to this vehicle, since the trajectories 4 and 5 of the front and rear wheels agree during a steady turning maneuver, the handling of the vehicle is substantially improved over the conventional vehicles which are steerable only by the front wheels.

However, even in this front and rear wheel steering vehicle, the inner radius difference becomes zero only when the vehicle makes a steady turn; as shown in FIG. 3, when the vehicle makes a right steady turn about a point $O_1$, with the vehicle body 1 changing its position from the position I to the position II, followed by a steady left turn about a point $O_2$ towards the position III, the trajectories 4 and 5 of the front and rear wheels 2 and 3 disagree from each other and the effect of improving the handling of the vehicle becomes insufficient whenever the direction of the turning motion is changed. In reality, since the steer angle is changed continually, the rear wheels move along trajectories which deviate from those of the front wheels in a highly complicated manner.

BRIEF SUMMARY OF THE INVENTION

In view of such problems of the prior art, a primary object of the present invention is to optimize the handling of a front and rear wheel vehicle not only when it makes a steady turn but also when it makes transitory turns, by making the trajectories of the front and rear wheels coincide each other at all time.

A second object of the present invention is to provide a front and rear wheel steering vehicle in which the trajectories of the front and rear wheels are made to coincide each other by means of a simple control structure.

A third object of the present invention is to provide a front and rear wheel steering vehicle which incorporates a control structure for controlling the rear wheel steer angle so as to ensure improved driving stability in high speed range and favorable handling in low speed range.

According to the present invention, these and other objects of the present invention are accomplished by providing a front and rear wheel steering vehicle, comprising: manual steering means for manually steering a front wheel; means for detecting the steering angle of the front wheel; memory means for storing the steering angle of the front wheel detected by the detecting means; and powered steering means for steering a rear wheel to a steer angle which coincides, in a spatially fixed absolute coordinate system, with the steer angle of the front wheel when it was located at the same location as the current position of the rear wheel.

Thus, since the inner radius difference is reduced to zero, the driver may drive the vehicle paying attention only to the positions of the front wheel. Thereby, the handling of the vehicle is much improved. Furthermore, the driving of the vehicle is much simplified because the driver may steer the vehicle without considering the size of the vehicle.

A preferred embodiment of the present invention further comprises means for detecting the yaw angle of the vehicle body; and means for subtracting from the steer angle of the front wheel at the time point when the front wheel was located at the current position of the rear wheel, the change in the yaw angle of the vehicle body from the said time point to the current time point. The yaw angle may be detected by using a yaw rate gyro detector or a compass; by dividing the difference between the travel distances of the right and left front wheels of the vehicle with the distance between the right and left front wheels; or by integrating the difference between the steer angles of the front wheel and the rear wheel of the vehicle over the distance corresponding to the distance between the front wheel and the rear wheel and covered by the front wheel.

Since the improved maneuverability of the front and rear wheel steering vehicle is necessary only in low speed range and is detrimental to the stability of the vehicle in high speed range, the steer angle of the rear wheel achieved by the powered steering means may be diminished by a certain factor which depends on the vehicle speed or the steer angle of the front wheel.

According to another preferred embodiment of the present invention which takes into account the differences in the steer angles of the right and left wheels, there is provided a front and rear wheel steering vehicle, comprising: a pair of front wheels; a pair of rear wheels; manual steering means for manually determining the steer angle of an imaginary central front wheel which is located at the middle point between the front wheels; memory means for storing the value of the steer angle of the imaginary central front wheel; computing means for computing the steer angle of an imaginary central rear wheel, which is located at the middle point between the rear wheels, in such a manner that the steer angle of the imaginary central rear wheel coincides, in a spatially fixed absolute coordinate system, with the steer angle of the imaginary central front wheel when it was located at the same location as the current position of the imaginary central rear wheel; and powered steering means for steering the real front and rear wheels perpendicularly to the lines drawn from the contact centers of the corresponding wheels to a turning center of the vehicle as given by the point of intersection of the lines drawn perpendicularly from the contact centers of the imaginary central front and rear wheels.

DETAILED DESCRIPTION OF THE PREFERRED EMBODIMENTS

Figure 1:
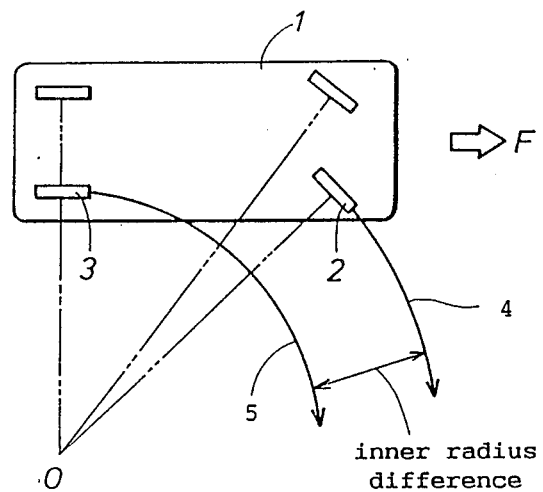
FIG. 1 shows the trajectories of the wheels of a conventional vehicle which is steerable only by its front wheels.
Figure 2:
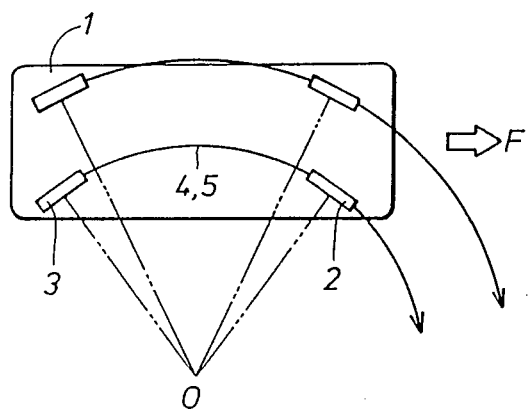
FIG. 2 shows the trajectories of a conventional four wheel steering vehicle.
Figure 3:
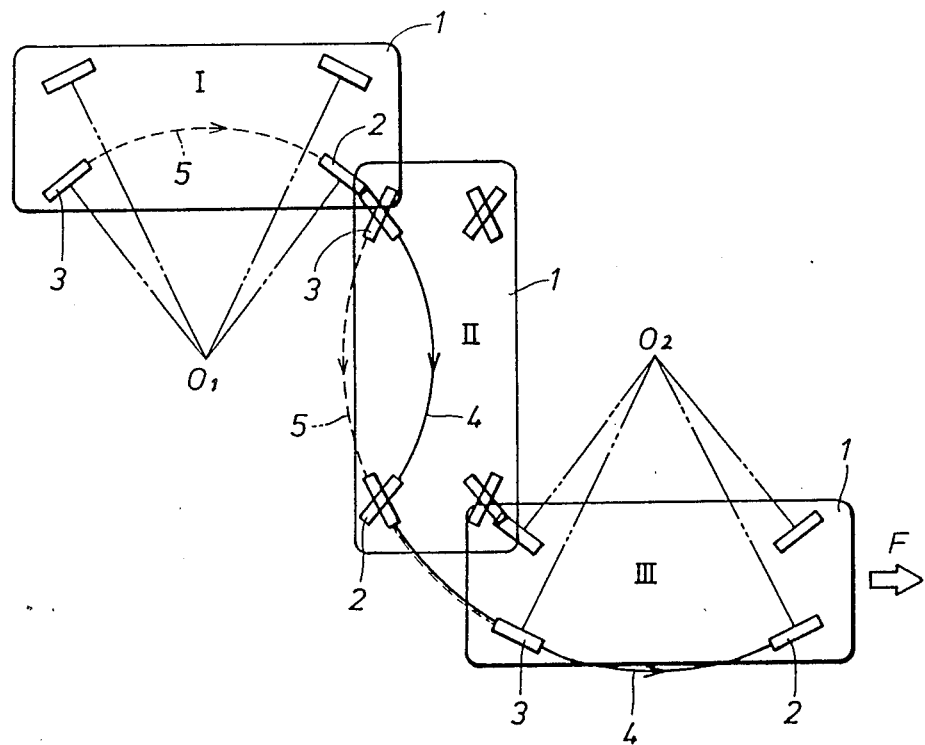
FIG. 3 is an illustrative view showing that there is a deviation between the trajectories of a front wheel and a rear wheel even in a conventional four wheel steering vehicle.
Figure 4:
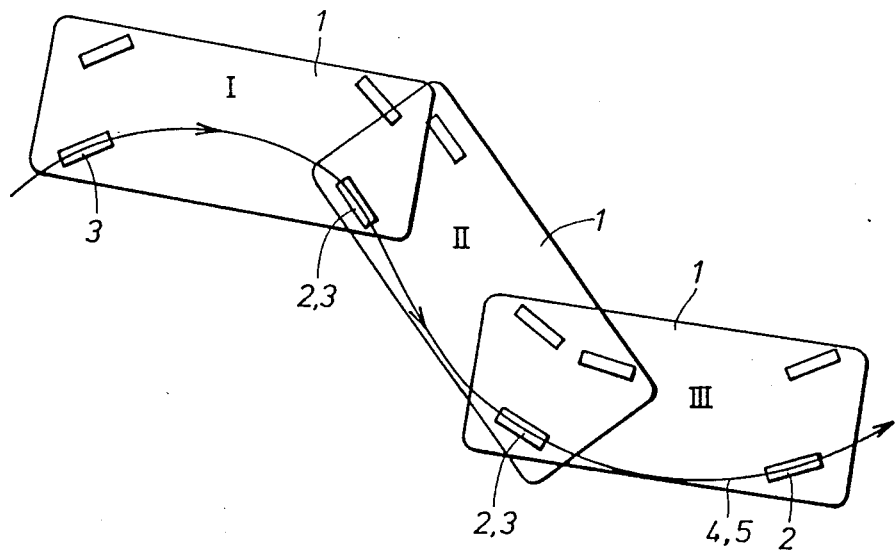
FIG. 4 is an illustrative view showing the trajectories of the front and rear wheels of the four wheel steering vehicle according to the present invention.

FIG. 4 illustrates the movement of a front and rear wheel steering vehicle according to the present invention. As the vehicle position changes from the position I to the positions II and III, the trajectories 4 and 5 of the front wheel 2 and the rear wheel 3 completely coincide each other, and the handling of the vehicle is optimized.

Figure 5:
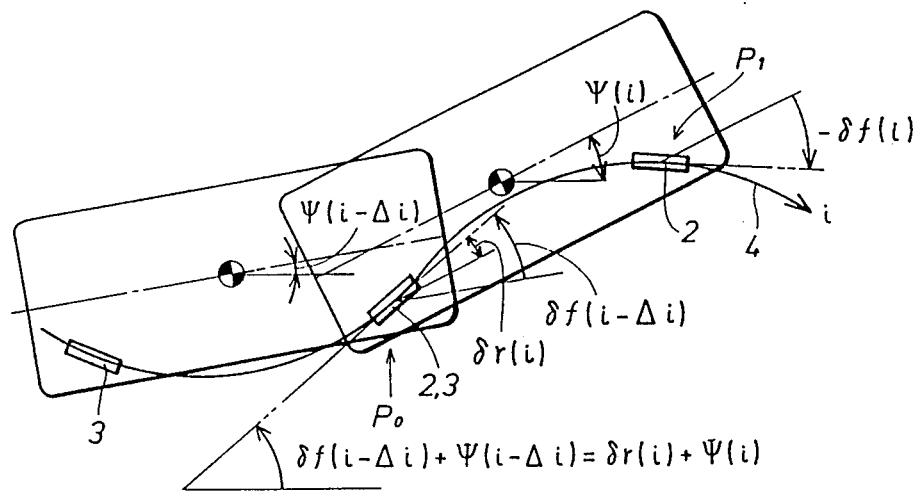
FIG. 5 shows a model for explaining the control scheme for controlling the rear wheels of the front and rear wheel steering vehicle according to the present invention.

FIG. 5 illustrates the theory for achieving such a control method for the rear wheel, and a coordinate system is set along the trajectory 4 of the front wheel 2 using the distance i along the trajectory 4 as the variable. Suppose the yaw angle of the vehicle is $\Psi(i)$, the steer angle of the front wheel 2 relative to the vehicle body is $\delta f(i)$, and the steer angle of the rear wheel 3 is $\delta r(i)$ relative to the vehicle body when the front wheel 2 is at a point $P_1$. At this time point, the rear wheel 3 is at a point $P_0$, and the coordinate of this point is set as $i - \Delta i$. Here, it is assumed that the yaw angle of the vehicle was $\Psi(i - \Delta i)$ and the steer angle of the front wheel was $\delta f(i - \Delta i)$ when the front wheel 2 was at the point $P_0$.

At this time point, it suffices if the steered direction of the front wheel 2 and the steered direction of the rear wheel 3 coincide each other in the absolute space. In other words, $$\delta f(i - \Delta i) + \Psi(i - \Delta i) = \delta r(i) + \Psi(i) \qquad (1)$$

The steer angle of the rear wheel 3 with respect to the vehicle body 1 $\delta r(i)$ is given from the above equation as follows:

$$\delta r(i) = \delta f(i - \Delta i) + \Psi(i - \Delta i) - \Psi(i) \qquad (2)$$

In other words, the steer angle of the rear wheel 3 at each point should be set to the value obtained by subtracting the change in the yaw angle from the steer angle of the front wheel at the current position of the rear wheel.

Figure 6:
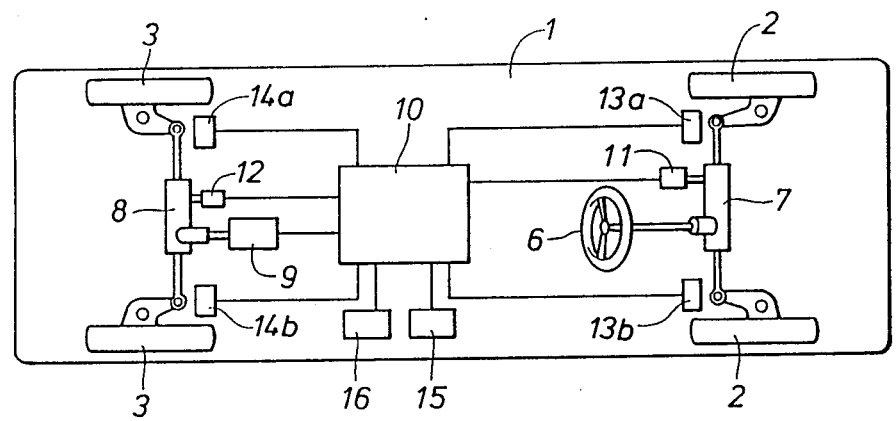
FIG. 6 is a plan view showing the general structure of the front and rear wheel steering vehicle according to the present invention.

FIG. 6 is a simplified plan view of a front and rear wheel steering vehicle which can control the steer angle of its rear wheel according to such an algorithm. The front wheels 2 are steered by a front wheel steering gear box 7 which is actuated by a steering wheel 6, and the rear wheels 3 are steered by a rear wheel steering gear box 8 which is actuated by an electric motor. The steer angle of the front wheels 2 is detected by steer angle sensor 11, and the output from the steer angle sensor 11 is supplied to a control computer 10 for determining the steer angle of the rear wheels 3 as described hereinafter. The rear wheel steering gear box 8 is provided with a similar steer angle sensor 11. The output from the steer angle sensor 12 is used for the servo action for actually achieving the steer angle of the rear wheels as determined by the control computer 10. Further, the output from a travel distance sensor, or vehicle speed sensors 13a, 13b, 14a and 14b, which detect the rotational speeds of the front and rear wheels, is also supplied to the control computer 10. Further, the outputs from a rate gyro 15 for detecting the yaw rate of the vehicle body and a compass 16 for detecting the absolute bearing of the vehicle body are likewise supplied to the control computer 10.

Figure 7:
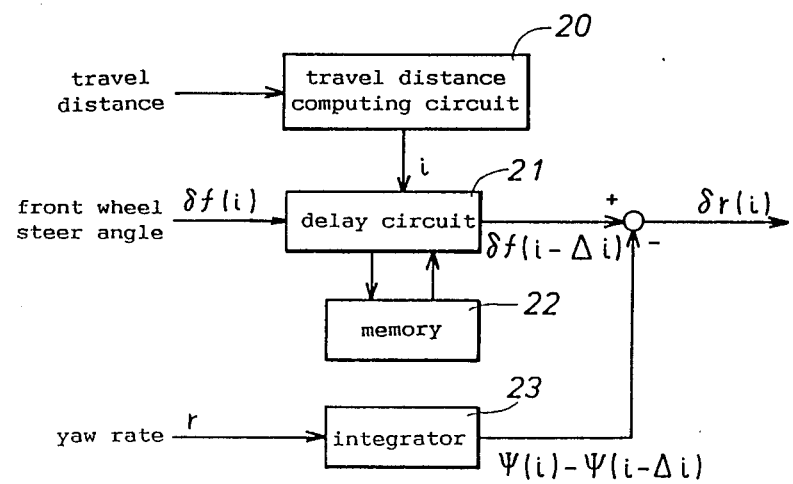
FIGS. 7 and 8 are block diagrams showing different embodiments of the control system for the front and rear wheel steering vehicle according to the present invention.

FIG. 7 is a block diagram which illustrates a functional structure for executing the algorithm given by Equation (2). For instance, the travel distance is computed from the outputs of the travel distance sensors 13a through 14b in a travel distance computing circuit 20, and its output i is supplied to a delay circuit 21. This delay circuit 21 also receives the value of the front wheel steer angle $\delta f(i)$ obtained from the steer angle sensor 11. The front wheel steer angle at each point is temporarily stored in memory 22, and the front wheel steer angle $\delta(i - \Delta i)$ is produced from the delay circuit 21 after a time delay which corresponds to $\Delta i$. The yaw rate r, which is given as the output from the rate gyro 15, is integrated over the time the wheel travels from the point $P_0$ to the point $P_1$ or over the time $i - \Delta i$ with an integrator 23, and the steer angle $\delta r(i)$ is obtained by subtracting the result of integration from the output of the delay circuit 21. To find the change in the yaw angle ΔΨ, it is also possible to use the compass 16. Alternatively, both the rate gyro 15 and the compass 16 may be used at the same time so that they may complement each other and compensate the influences of the drift arising from the integration process when using the rate gyro 15 and the lack of precision when using the compass 16.

Also, it is possible to obtain a reasonable result by approximating the difference Δi in the travel distances of the trajectories of the front and rear wheels with the wheel base of the vehicle, and performing approximated computations.

Now, a method for estimating the change in the yaw angle without using a rate gyro or compass is described in the following. Suppose the tread of the vehicle is d, and the travel distances derived from the rotational speeds of the right and left wheels are ΔiR and ΔiL, respectively. Then, the change is the yaw angle can be estimated by $$\Delta\Psi = (\Delta iR - \Delta iL)/d \tag{3}$$

By using this relationship, the rear wheel steer angle can be computed with the following formula.

$$\delta r(i) = \delta f(i - \Delta i) - \Delta\Psi \tag{4}$$

It is also possible to estimate the change in the yaw according to the following formula.

$$\Delta\Psi = \Psi(i) - \Psi(i - \Delta i) \\
= (1/L) \int_{i-\Delta i}^{i} \{\delta f(i^*) - \delta r(i^*)\} di^* \tag{5}$$

where i* is the variable for performing the integration and L is the wheel base which was mentioned earlier. From the above equation, the following equation can be derived.

$$\delta r(i) = \delta f(i - \Delta i) - (1/l) \int_{i-\Delta i}^{i} \{\delta f(i^*) - \delta r(i^*)\} di^* \tag{6}$$

Thus, the optimum rear wheel steer angle can be computed from the rotational speeds of the wheels and the steer angle of the front wheel alone.

Figure 8:
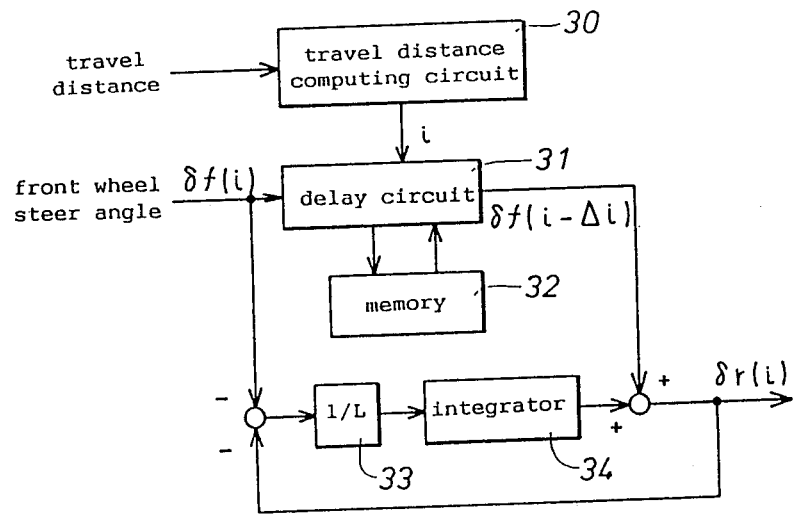

In short, the rear wheel steer angle can be computed in terms of the structure illustrated in FIG. 8 in the following manner. First of all, the travel distance is computed in the travel distance computing circuit 30 according to the outputs from the travel distance sensors 13a through 14b, and the output i from this circuit is supplied to the delay circuit 31. The delay circuit 31 also receives the value of the front wheel steer angle δf(i) obtained from the steer angle sensor 11. The front wheel steer angle at each point is temporarily stored in memory 32, and the front wheel steer angle δf(i−Δi) is outputted from the delay circuit 31 after a delay time corresponding to Δi. The sum of the output from the integrator 34 and the output from the delay circuit 31 is given as the rear wheel steer angle δr(i). The input for the integrator 34, however, is obtained by subtracting the rear wheel steer angle δr(i) from the front wheel steer angle δf(i) and multiplying the difference by a multiplier 33.

Thus, the handling of the vehicle can be substantially improved, but since there is a difference in the travel distances of the front and rear wheels, a certain problem arises when an attempt is made to carry out the algorithm which was mentioned earlier. Specifically, the front wheel steer angle is stored for each time step or each step of the travel distance of the front wheel, but the rear wheels may not coincide with the positions which the front wheels occupied in the past, and some corrections are required. Moreover, in the above described embodiments, the algorithm was executed looking only at, for instance, the right wheels of the vehicle, but, as well known, the steer angles of the right and left wheels generally disagree, and it is preferable to steer the four wheels so that they all always have the same center of turning. Therefore, if the steering is performed taking only the steer angles of the right wheels into account, the driver may experience a subtle, peculiar feeling.

The embodiment described in the following with reference to FIGS. 9 to 15 takes these factors into account.

Figure 9:
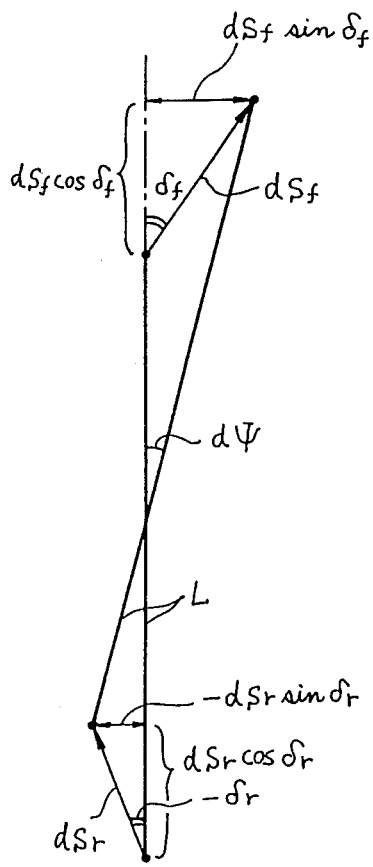
FIG. 9 is a geometric illustrative view for showing the relationships between the steer angles of the front and rear wheel, the yaw angle and the travel distances of the front and rear wheels.

FIG. 9 shows the state in which the front and rear wheels are steered by angles δf and −δr, respectively, and have advanced by small distances dsf and dsr, respectively, thereby causing a yaw angle change of dΨ. From the illustrated geometrical relationships, one can obtain $$Ld\Psi = dsf \sin \delta f - dsr \sin \delta r \tag{8a}$$

$$dsf \cos \delta f = dsr \cos \delta r \tag{8b}$$

and from Equation (8b), $$dsr = (\cos \delta f / \cos \delta r) dsf \tag{9a}$$

By substituting Equation (9a) into Equation (8a), one can obtain $$d\Psi = (\sin \delta f - \cos \delta f \tan \delta r) dsf/L \tag{9b}$$

Here, it is assumed that n-1 travel distance steps are required for the rear wheel to reach the current position of the front wheel. Therefore, the steer angles of the front and rear wheels and the yaw angle of the vehicle with respect to the absolute space coordinate system can be expressed as follows $$\left.\begin{array}{l}\delta f(i) \\ \delta r(i) \\ \Psi(i)\end{array}\right\} i = 1, \ldots, n$$

In order to make the steered direction of the rear wheel coincide with the tangential direction of the trajectory of the past position of the front wheel when it was located at the current position of the rear wheel, the steer angle of the rear wheel at each time point should be given by the following equation.

$$\delta r(n) = \delta f(1) - \sum_{i=1}^{n-1} d\Psi(i) \tag{10}$$

where $d\Psi(i) = \Psi(i+1) - \Psi(i)$

Figure 10:
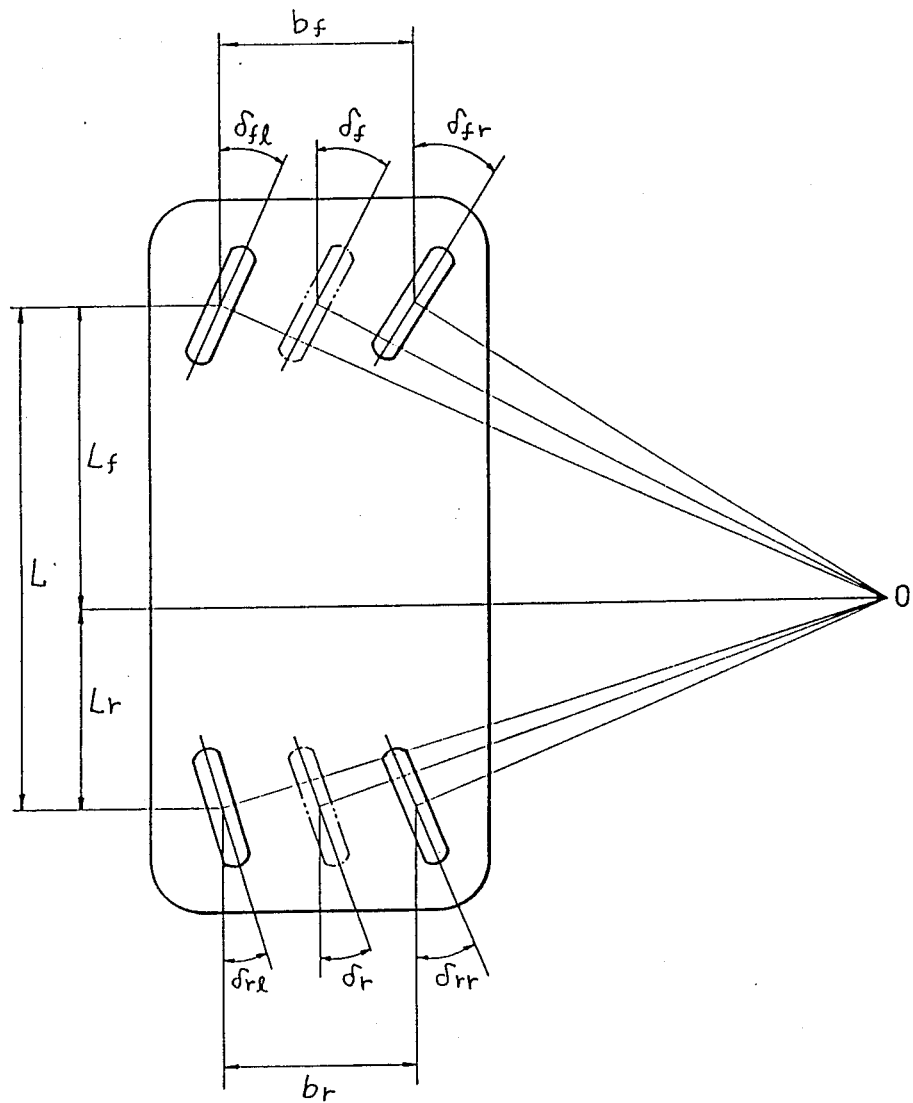
FIG. 10 is a schematic plan view of a front and rear wheel steering vehicle for explaining an embodiment of the steering method according to the present invention.

FIG. 10 is a plan view showing the steer angles of the wheels as well as the turning center 0 of the vehicle when an imaginary central front wheel and an imaginary central rear wheel are considered. According to the well known geometrical relationship, the following equations (11) through (16) are obtained.

$$\cot \delta fr = \cot \delta f - bf/2Lf \quad (11)$$

$$\cot \delta fl = \cot \delta f - bf/2Lf \quad (12)$$

$$\cot \delta rr = \cot \delta r - br/2Lr \quad (13)$$

$$\cot \delta rl = \cot \delta r - br/2Lr \quad (14)$$

$$Lf = \frac{-\tan \delta f}{(\tan \delta r - \tan \delta f)L} \quad (15)$$

$$Lr = \frac{-\tan \delta r}{(\tan \delta f - \tan \delta r)L} \quad (16)$$

except for the case where $\delta_r = \delta_f$.

Figure 11:
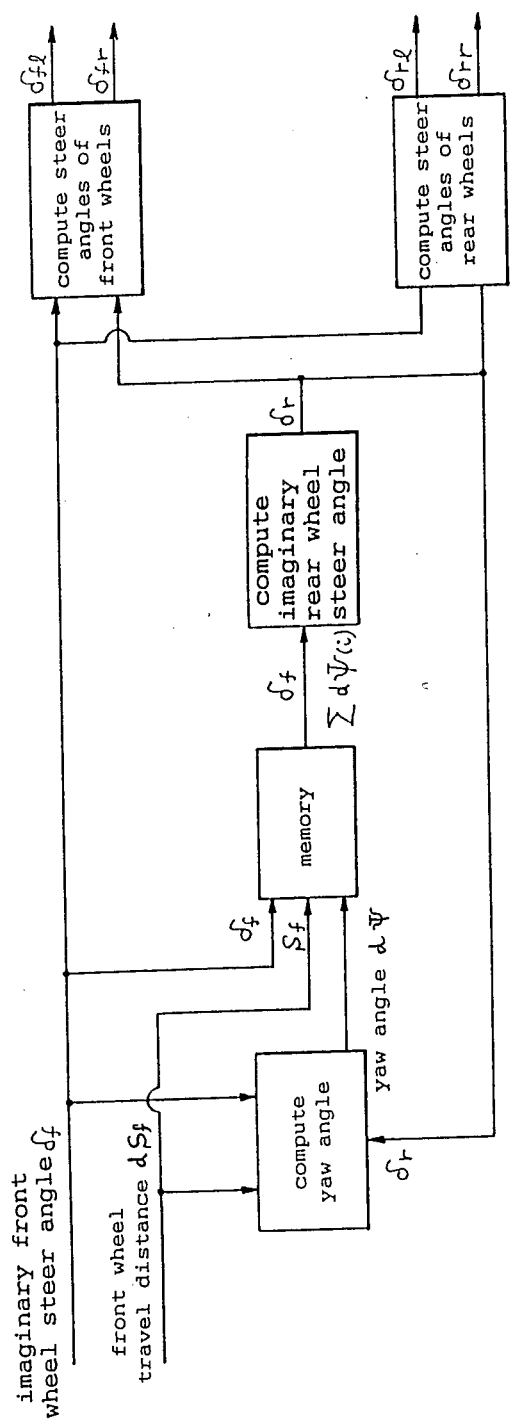
FIG. 11 is a flow diagram for showing the method for controlling the rear wheel by using imaginary central wheels illustrated in FIG. 10.
Figure 12:
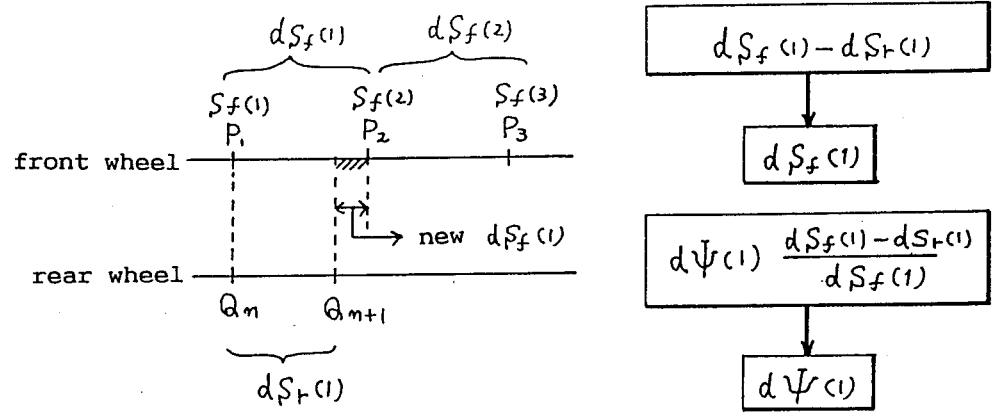
FIGS. 12 and 13 are diagrams for explaining the method for avoiding the problem in the execution of the computation due to the difference in the step sizes of the travel distances of the front and rear wheels.

FIG. 11 is a flow diagram for explaining the algorithm of the present embodiment. The change in the yaw angle $d\Psi$ is obtained from the steer angle of the imaginary central front wheel $\delta f$, the travel distance the front wheel sf and the steer angle of the imaginary central rear wheel $\delta r$, using Equation (9). Thereafter, the steer angle of the imaginary front wheel $\delta f$, the change in the travel distance of the front wheel dsf and the change in the yaw angle $d\Psi$ are stored in the memory for each travel distance step $i=1, \ldots, n$. Here, when the position of the rear wheel sr(n) has advanced by one step from a position $P_1$ which was occupied by the front wheel in the past ($Q_n \rightarrow Q_{n+1}$), the new position $Q_{n+1}$ may either exceed the next position $P_2$ of the front wheel or may fall short of the position $P_2$. In the latter case, as shown in FIG. 12, the next step length dsf(1) of the travel distance sf of the front wheel in the next computation cycle should be $$dsf(1) - dsr(1) \quad (17a)$$

In this case, the data points are not shifted, and the number of data points increases by one.

In the former case, or when the new position $Q_{n+1}$ of the rear wheel exceeds the next position $P_2$ of the front wheel, the first step length dsf(1) of the travel distance of the front wheel in the new cycle of computation should be $$dsf(1) - dsr(1) + dsf(2) \quad (17b)$$

In this case, the old sf(1) is cleared and the data points are all shifted up.

Figure 13:
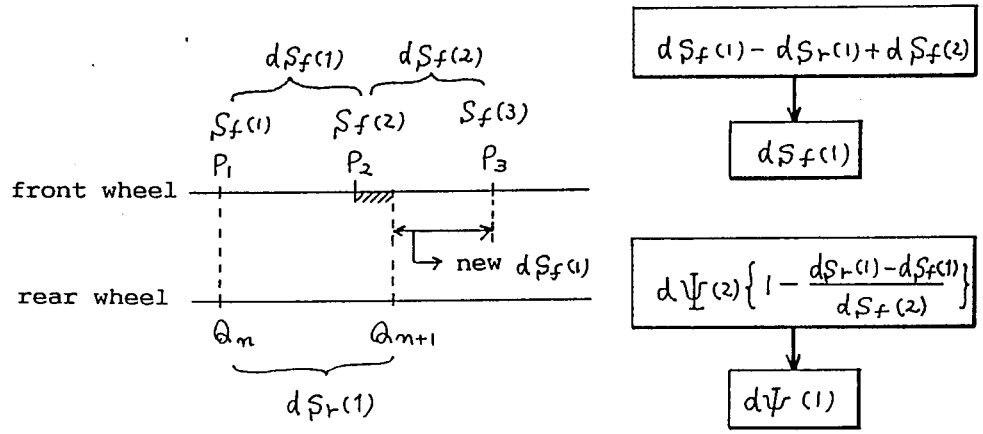

Since the change in the yaw angle in Equation (9a) depends on the change in the step length of the front wheel travel distance, in the case given in FIG. 12, $d\Psi(1)$ in the new cycle of computation should be $$d\Psi(1)\{(dsf(1)-dsr(1))/dsf(1)\} \quad (18b)$$

and, in the case given in FIG. 13, $d\Psi(1)$ in the new cycle of computation should be $$d\Psi(2)\{1-(dsr(1)-dsf(1))/dsf(2)\} \quad (18b)$$

In this way, the steer angle $\delta r$ of the imaginary rear wheel at each time point is obtained from Equation (10). Here, a limit is imposed upon the reading of data until the vehicle has traveled more than a certain distance to the end of preventing memory overflow when the vehicle speed is too small. Further, as initial data, the front wheel steer angle is set to zero, the yaw angle also to zero and the front wheel travel distance as the wheel base, respectively, and the internal data are initialized when the vehicle starts off or moves backward.

As mentioned above, the right and left, front and rear wheels must be steered so that they may have the same turning center as the imaginary front and rear wheels. Therefore, after the steer angles of the imaginary front and rear wheels $\delta f$ and $\delta r$ are obtained, the steer angles of the right and left, front wheels $\delta fr$ and $\delta fl$ and the steer angles of the right and left, rear wheels $\delta rr$ and $\delta rl$ are computed according to Equations (11) through (16) and the wheels are steered to the corresponding steer angles.

Figure 14:
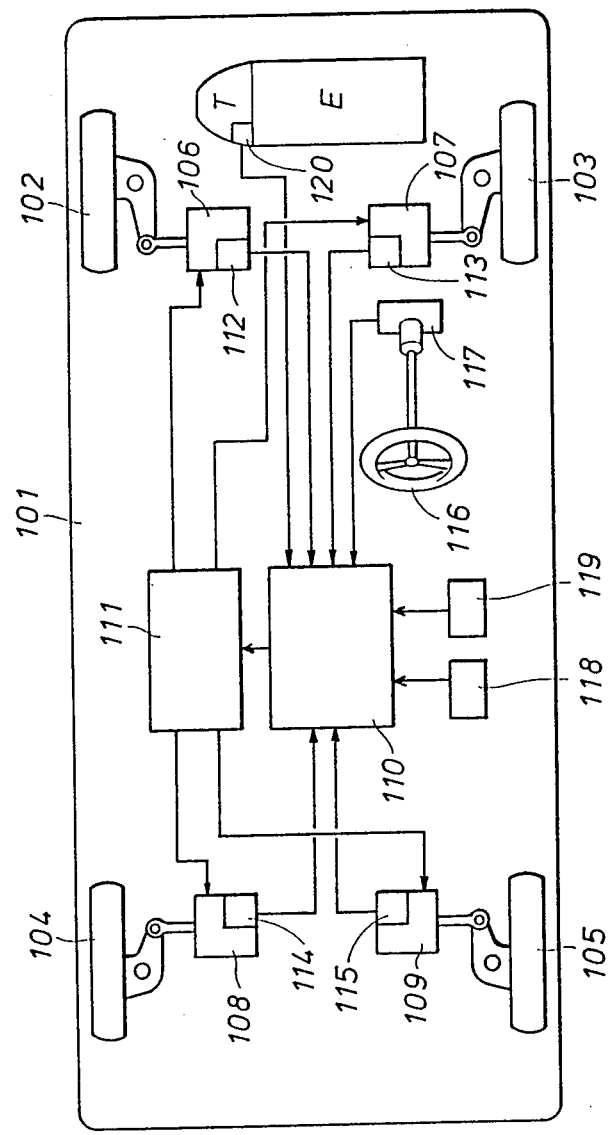
FIG. 14 is a plan view showing the general structure of a different embodiment of the front and rear wheel steering vehicle according to the present invention.

FIG. 14 shows a model of the front and rear wheel steering vehicle whose front and rear wheels can be steered according to such an algorithm. In this vehicle, the front wheels 102 and 103 and the rear wheels 104 and 105 are steered by individual steering motors 106 through 109 which are in turn controlled by a control computer 110 by way of a motor driver 111. The steer angles of the wheels 102 through 105, the steering angle of the steering wheel 116, the yaw rate of the vehicle body 101, the absolute bearing of the vehicle body 101 and the vehicle speed are detected by steer angle sensors 112 through 115, a steer angle sensor 117, a rate gyro 118, a compass 119 and a vehicle speed sensor 120, respectively, and their output signals are supplied to the control computer 110.

Figure 15:
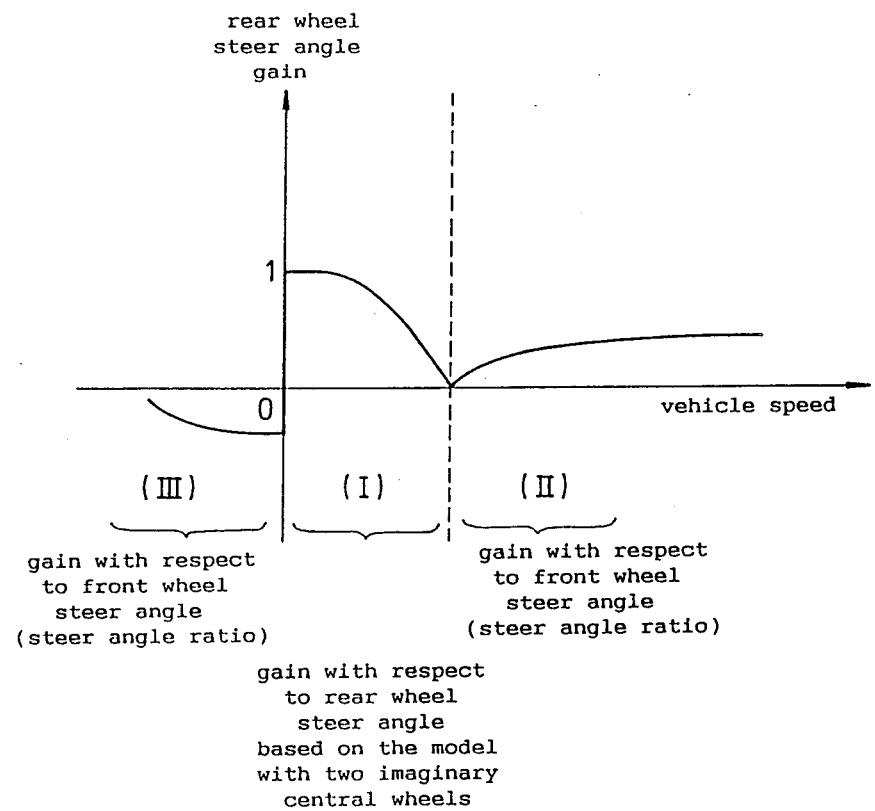
FIG. 15 is a graph showing the method for correcting the steer angles of the rear wheels by a predetermined factor which depends on the vehicle speed.

Generally speaking, the rear wheels are required to be steered so as to follow the trajectories of the front wheels only when the vehicle travels on tortuous roads, such as S-shaped roads, crank-shaped roads, and so on, at low speed. Therefore, it is conceivable to control the rear wheels so as to follow the trajectories of the front wheels only in low speed range and deactivate this control in high speed range. FIG. 15 shows such an example of the steer angle gain in relation with the vehicle speed. In extremely low speed range, the steer angle command for the rear wheels are produced so as to make the trajectories of the front and rear wheels coincide each other, but as the vehicle speed increases, the steer angles of the rear wheels are reduced as the vehicle speed is increased as indicated by the region I so as to prevent abrupt turning motion of the vehicle. In other regions II and III, by determining the steer angle ratio of the rear wheels with respect to the front wheels according to the vehicle speed, the action of the existing, speed-dependent four wheel steering vehicle can be obtained. If the rear wheel steer angles are determined according to the steer angles of the front wheels instead of the vehicle speed, the action of the steer-angle-dependent four wheel steering vehicle can be obtained. Further, by fixing the rear wheel steer angles to zero, the action of the conventional two wheel steering vehicle can be obtained.

Thus, according to the present invention, since the handling of a vehicle can be much improved by steering the rear wheels according to a relatively simple algorithm, a substantial advantage can be obtained. Further, the present invention is not limited to the four wheel passenger vehicles but may be applicable to other front and rear wheel steering vehicles such as industrial vehicles and earth moving machinery having four or more wheels.

We claim:

1. A front and rear wheel steering vehicle, comprising:

manual steering means for manually steering a front wheel;

means for detecting a steering angle of said front wheel;

memory means for storing said steering angle of said front wheel detected by said detecting means; and powered steering means for steering a rear wheel to a steering angle which coincides, in a spatially fixed absolute coordinate system, with the steering angle of said front wheel stored in the memory means when said front wheel was located at a location which is a current location of said rear wheel.

2. A front and rear wheel steering vehicle as defined in claim 1, wherein said memory means comprises a delay circuit for providing a time delay.

3. A front and rear wheel steering vehicle as defined in claim 1, further comprising means for detecting a yaw angle of the vehicle body; and means for subtracting from the steering angle of said front wheel at the time point when said front wheel was located at the current location of said rear wheel, the change in the yaw angle of said vehicle body from said time point to the current time point.

4. A front and rear wheel steering vehicle as defined in claim 3, wherein said yaw angle is detected by a yaw rate gyro detector.

5. A front and rear wheel steering vehicle as defined in claim 3, wherein said yaw angle is detected by a compass.

6. A front and rear wheel steering vehicle as defined in claim 3, wherein said vehicle is provided with a second front wheel which is placed laterally of said vehicle body with respect to said first front wheel, and said yaw angle is detected by dividing the difference between travel distances of said right and left front wheels of said vehicles with the distance between said right and left front wheels.

7. A front and rear wheel steering vehicle as defined in claim 3, wherein said yaw angle is detected by integrating a difference between steering angles of said front wheel and said rear wheel over the distance corresponding to the distance between said front wheel and said rear wheel and covered by said front wheel.

8. A front and rear wheel steering vehicle as defined in claim 1, wherein said steering angle of said rear wheel is diminished by a factor which depends on the vehicle speed.

9. A front and rear wheel steering vehicle as defined in claim 1, wherein said steering angle of said rear wheel is diminished by a factor which depends on the steering angle of said front wheel.

10. A front and rear wheel steering vehicle, comprising:

a pair of front wheels;

a pair of rear wheels;

manual steering means for manually determining a steering angle of an imaginary central front wheel which is located at a middle point between said front wheels;

memory means for storing said steering angle of said imaginary central front wheel;

computing means for computing a steering angle of an imaginary central rear wheel located at a middle point between said rear wheels, in such a manner that said steering angle of said imaginary central rear wheel coincides, in a spatially fixed absolute coordinate system, with said steering angle of said imaginary central front wheel stored in the memory means when said imaginary central front wheel was located at a location which is a current location of said imaginary central rear wheel; and powered steering means for steering said front and rear wheels perpendicularly to lines drawn from contact centers of the corresponding wheels to a turning center of the vehicle defined by the point of intersection of lines drawn perpendicularly from the contact centers of said imaginary central front and rear wheels.

11. A front and rear wheel steering vehicle as defined in claim 10, wherein said memory means comprises a delay circuit for providing a time delay.

12. A front and rear wheel steering vehicle as defined in claim 10, further comprising means for detecting a yaw angle of a body of the vehicle; and means for subtracting from the steering angle of said imaginary central front wheel at the time point when said imaginary central front wheel was located at the current location of said imaginary central rear wheel, the change in a yaw angle of said vehicle body from said time point to the current time point.

13. A front and rear wheel steering vehicle as defined in claim 12, wherein said yaw angle is detected by a yaw rate gyro detector.

14. A front and rear wheel steering vehicle as defined in claim 12, wherein said yaw angle is detected by a compass.

15. A front and rear wheel steering vehicle as defined in claim 12, wherein said yaw angle is detected by dividing the difference between travel distances of a right and a left front wheel of said pair of front wheels with the distance between said right and left front wheels.

16. A front and rear wheel steering vehicle as defined in claim 12, wherein said yaw angle is detected by integrating a difference between the steering angles of said imaginary central front wheel and said imaginary central rear wheel over the distance corresponding to the distance between said imaginary central front wheel and said imaginary central rear wheel and covered by said imaginary central front wheel.

17. A front and rear wheel steering vehicle as defined in claim 10, wherein said steering angle of said imaginary central rear wheel is diminished by a factor which depends on the vehicle speed.

18. A front and rear wheel steering vehicle as defined in claim 10, wherein said steering angle of said imaginary central rear wheel is diminished by a factor which depends on the steering angle of said imaginary central front wheel.

* * * * *